(12) United States Patent
Lai

(10) Patent No.: US 11,586,004 B1
(45) Date of Patent: Feb. 21, 2023

(54) DRIVING MECHANISM WITH LINEAR CLAMP FOR ROTATABLE RING ON CAMERA LENS

(71) Applicant: Ortery Technologies, Inc., Irvine, CA (US)

(72) Inventor: Peng-Cheng Lai, Los Altos, CA (US)

(73) Assignee: Ortery Technologies, Inc., Irvine, CA (US)

( * ) Notice: Subject to any disclaimer, the term of this patent is extended or adjusted under 35 U.S.C. 154(b) by 0 days.

(21) Appl. No.: 17/685,460

(22) Filed: Mar. 3, 2022

(51) Int. Cl.
  *G02B 7/04* (2021.01)
  *G03B 19/20* (2021.01)
  *G03B 3/10* (2021.01)

(52) U.S. Cl.
  CPC ............... *G02B 7/04* (2013.01); *G03B 3/10* (2013.01); *G03B 19/20* (2013.01)

(58) Field of Classification Search
  CPC ............ G02B 7/04; G03B 3/10; G03B 19/20
  See application file for complete search history.

(56) References Cited

U.S. PATENT DOCUMENTS 9,632,392 B1 * 4/2017 Weidner .................. G03B 3/00

FOREIGN PATENT DOCUMENTS

| CN | 108646374 A | * | 10/2018 | ............ G02B 7/026 |
| CN | 109521626 A | * | 3/2019 | |
| CN | 110109250 A | * | 8/2019 | ......... G02B 27/0172 |
| CN | 110196479 A | * | 9/2019 | |
| CN | 113946093 A | * | 1/2022 | |
| CN | 114236945 A | * | 3/2022 | |
| WO | WO-2020000314 A1 | * | 1/2020 | ............ G02B 7/023 |

* cited by examiner

*Primary Examiner* — Clayton E. LaBalle
*Assistant Examiner* — Diana Hancock

(57) ABSTRACT

A driving mechanism with linear clamp for driving a rotatable ring of a lens on a camera to rotate including a base, a driving unit, a slave unit and a clamping unit is provided, wherein the rotatable ring can be a focus ring or a zoom ring. The camera is hold on the base, while the driving unit and the slave unit are glidingly disposed on the base and located at opposite sides of the lens. The driving unit includes at least a driven wheel, and the slave unit includes at least an idler wheel. The clamping unit is disposed on the base for synchronously moving the driving unit and the slave unit toward the lens to let the driven wheel and the idler wheel lean against the rotatable ring in different directions, so the idler wheel will be rotated when the driven wheel drives the rotatable ring to rotate.

20 Claims, 3 Drawing Sheets

DRIVING MECHANISM WITH LINEAR CLAMP FOR ROTATABLE RING ON CAMERA LENS

FIELD OF THE INVENTION

The present invention relates to a driving mechanism, and more particularly to a driving mechanism with linear clamp for a rotatable ring on a camera lens.

DESCRIPTION OF THE RELATED ART

To capture clear images, it is necessary to let the camera and lens properly focus on the object. Most of the commercially available digital single lens reflex cameras (DSLR) and the mirrorless interchangeable lens cameras (MILC) and their compatible lenses support manual focus (MF) mode, so as to enable the users to adjust the focal length by rotating the focus ring on the lens. To a zoom lens, the users can also zoom in/out the lens by rotating the zoom ring on it, so as to adjust the camera's angle of view without walking forward or backward. Some of the commercially available camera stabilizers and robotic arms further have motorized zoom and/or focus mechanisms, so as to enable the users to zoom in/out the lenses and/or adjust the focal lengths without touching the lenses.

FIG. 1 illustrates a structural schematic view of a motorized zoom mechanism in the related art. Referring to FIG. 1, the camera 10 is fastened on the base 20, while the motorized zoom mechanism 30 is fastened on a round bar 21 of the base 20, and the gear wheel 31 engages with the gear ring 32 fitting onto the lens 11. Accordingly, the motorized zoom mechanism 30 can drive the zoom ring of the lens 11 to rotate via the engagement of the gear wheel 31 and the gear ring 32. In the related art, the motorized zoom mechanism 30 is suitable for the lenses 11 with various diameters since it can be swung around the round bar 21. However, the lenses 11 and/or the motorized zoom mechanism 30 are possibly pushed away and thus make the gear wheel 31 be disengaged from the gear ring 32 due to a reaction force when the motorized zoom mechanism 30 drives the zoom ring to rotate.

Taiwan Patent Number 1373685 shows another motorized zoom mechanism, wherein the adapting rings clinch around the lens and are seated on the big gear engaged with the small gear, so that the motor can drive the lens to zoom in/out via the big and small gears. However, in such a case, users must prepare various adapting rings and big gears with different sizes for various lenses with different diameters. Accordingly, it is desired to provide a new motorized zoom/focus mechanism not only won't push away the camera and the lens but also can use for various lenses with different diameters.

SUMMARY OF THE INVENTION

The present invention is directed to a driving mechanism with linear clamp, which can not only be adapted to various sizes of cameras and lenses, but also rotate the rotatable ring of the camera lens with a balanced force to prevent from the camera and the lens being pushed away.

The present invention provides a driving mechanism with linear clamp for driving a rotatable ring of a lens on a camera to rotate, wherein the rotatable ring can be a focus ring or a zoom ring. The driving mechanism with linear clamp is composed of a base, a driving unit, a slave unit and a clamping unit. The camera is hold on the base, while the driving unit and the slave unit are glidingly disposed on the base and located at opposite sides of the lens. The driving unit comprises at least a driven wheel, while the slave unit comprises at least an idler wheel. The clamping unit is disposed on the base for driving the driving unit and the slave unit to synchronously move toward the lens to let the driven wheel and the idler wheel lean against the rotatable ring in different directions, wherein the idler wheel will be rotated by the rotatable ring when the driving unit drives the driven wheel to rotate the rotatable ring.

According to an embodiment of the present invention, the base comprises a holding piece and a sliding piece. The driving unit and the slave unit are glidingly disposed to the holding piece, and the clamping unit is disposed to the holding piece. The sliding piece is glidingly disposed to the holding piece and holds the camera. At least one of the holding piece and the sliding piece has at least a guiding portion, while the other one of the holding piece and the sliding piece has at least a sliding portion, and the guiding portion matches with the sliding portion to enable the camera to be slid related to the holding piece at least along an axial direction of the lens, a radial direction of the lens and a lateral direction perpendicular to the axial direction and the radial direction. In a specific embodiment of the present invention, the holding piece can be a cover plate, and can also have an installation surface and a round hole passing through the installation surface. The lens can align with the round hole, and the sliding piece, the driving unit, the slave unit and the clamping unit can be disposed on the installation surface around the round hole. Moreover, in another specific embodiment of the present invention, the guiding portion and the sliding portion can be composed of at least one of a linear guide rod mechanism, a lead screw mechanism, a linear rail mechanism and a set of gear rack and gear wheel.

According to an embodiment of the present invention, each of the driving unit and the slave unit is glidingly disposed to the base via at least one of a linear guide rod mechanism, a lead screw mechanism, a linear rail mechanism and a set of gear rack and gear wheel.

According to an embodiment of the present invention, the driving unit comprises a connecting piece and a motor. The connecting piece is glidingly disposed to the base, while the driven wheel is disposed to a side of the connecting piece facing toward the lens, and the clamping unit is capable of bringing the connecting piece and the slave unit to synchronously move toward the lens. The motor connects with the driven wheel, so as to rotate the rotatable ring via the driven wheel.

According to an embodiment of the present invention, a number of the driven wheel is plural, and the driving unit further comprises a connecting piece, a timing belt and a motor. The connecting piece is glidingly disposed to the base, and at least one of the driven wheels is disposed to a side of the connecting piece facing toward the lens. The clamping unit is capable of bringing the connecting piece and the slave unit to synchronously move toward the lens. The timing belt connects the driven wheels, while the motor connects with one of the driven wheels and is capable of rotate the rotatable ring via the timing belt and the driven wheels.

According to an embodiment of the present invention, the slave unit further comprises a connecting piece glidingly disposed to the base, while the idler wheel is disposed to a side of the connecting piece facing toward the lens, and the clamping unit is capable of bringing the driving unit and the connecting piece to synchronously move toward the lens.

According to an embodiment of the present invention, a number of the idler wheel is plural, and the slave unit further comprises a connecting piece and a timing belt. The connecting piece is glidingly disposed to the base, and at least one of the idler wheels is disposed to a side of the connecting piece facing toward the lens. The clamping unit is capable of bringing the driving unit and the connecting piece to synchronously move toward the lens, and the timing belt connects the idler wheels.

According to an embodiment of the present invention, the slave unit further comprises an encoder connecting with the idler wheel for counting a rotation number of the rotatable ring.

According to an embodiment of the present invention, each of the driven wheel and the idler wheel is a pulley, a gear wheel or a combination thereof.

According to an embodiment of the present invention, each of the driven wheel and the idler wheel is a pulley having textures on a surface facing toward the rotatable ring.

According to an embodiment of the present invention, the clamping unit is composed of at least one of a linear guide rod mechanism, a lead screw mechanism, a linear rail mechanism and a set of gear rack and gear wheel.

According to an embodiment of the present invention, the clamping unit is driven by a motor and capable of bringing the driving unit and the slave unit to synchronously move toward the lens.

According to an embodiment of the present invention, the clamping unit comprises a lead screw, a first nut and a second nut. The lead screw has a first spiral and a second spiral with opposite spiral directions. The first nut screws on the first spiral and the driving unit connects with the first nut. The second nut screws on the second spiral and the slave unit connects with the second nut. The first nut and the second nut bring the driving unit and the slave unit to synchronously move toward the lens when the lead screw rotates. In a specific embodiment of the present invention, the lead screw further comprises a handle disposed between the first spiral and the second spiral. In another specific embodiment of the present invention, the lead screw further comprises a handle, and one of the first spiral and the second spiral is disposed between the handle and the other one of the first spiral and the second spiral.

According to an embodiment of the present invention, the driving mechanism with linear clamp further comprises at least a first elastic piece and at least a second elastic piece. The first elastic piece is disposed between the driving unit and the clamping unit, and the second elastic piece is disposed between the slave unit and the clamping unit.

According to an embodiment of the present invention, the driving mechanism with linear clamp further comprises a tilt unit disposed to the base and comprising at least a side wall, at least a shaft and at least another driving unit. The side wall connects with an edge of the base, while the shaft connects with the side wall, and the another driving unit is capable of tilting the camera by driving the side wall and the base to rotate about the shaft. In a specific embodiment of the present invention, the another driving unit drives the side wall and the base to rotate about the shaft by at least a gear wheel, at least a timing belt or a combination thereof driven by a motor.

Accordingly, in the present invention, the clamping unit can bring the driving unit and the slave unit to synchronously move toward the lens to let the driven wheel and the idler wheel lean against the rotatable ring in different directions. Therefore, when the driving unit drives the driven wheel to rotate the rotatable ring, the idler wheel will stably lean against the rotatable ring from an opposite direction to prevent from the camera and the lens being pushed away.

DETAILED DESCRIPTION OF THE INVENTION

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations are not described in detail in order not to obscure the present invention. Besides, in all of the following embodiments, the same or similar components illustrated in different embodiments refer to the same symbols.

Figure 1:
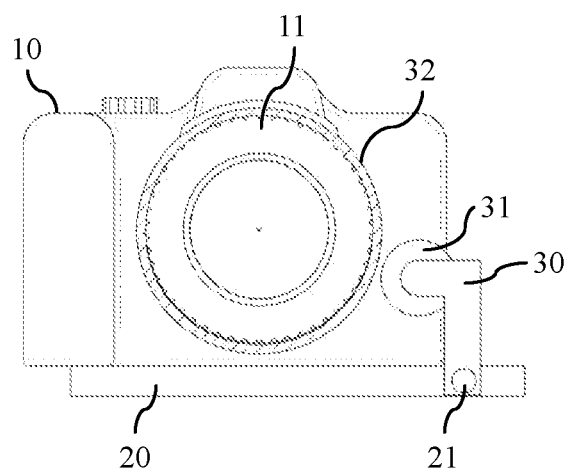
FIG. 1 illustrates a structural schematic view of a motorized zoom mechanism in the related art.
Figure 2:
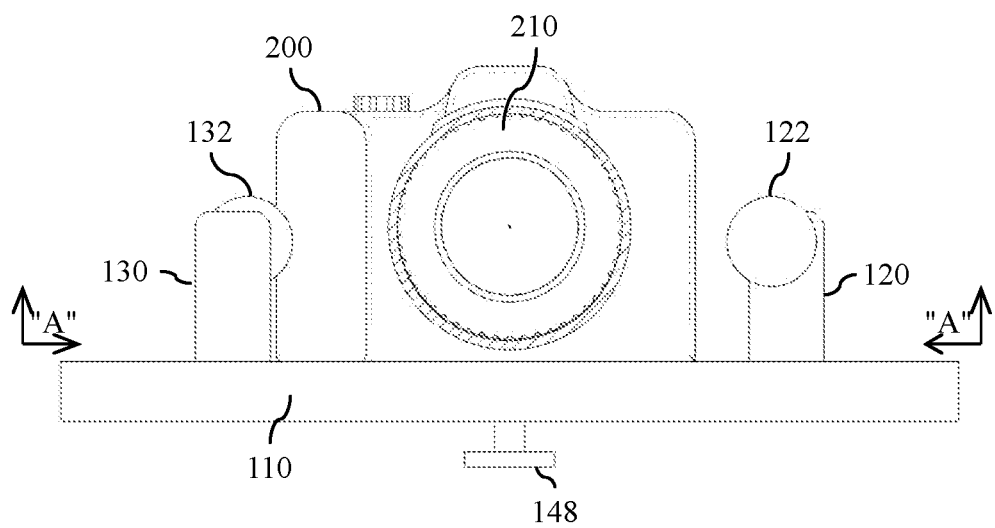
FIG. 2 illustrates a structural schematic view of a driving mechanism with linear clamp according to an embodiment of the present invention.
Figure 3:
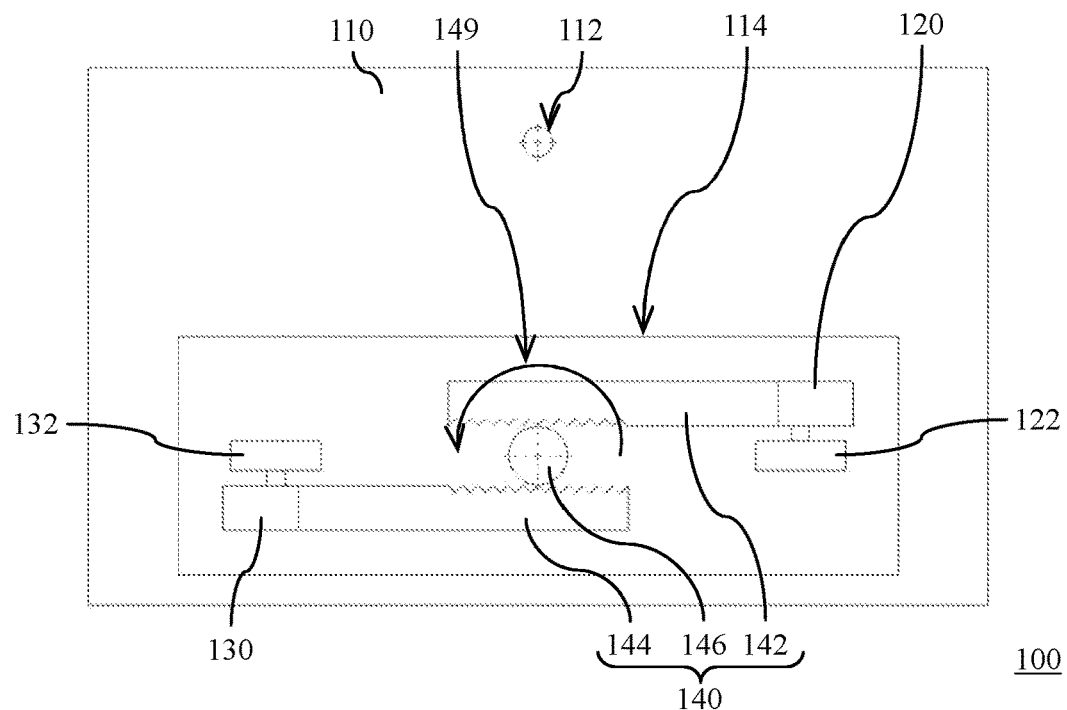
FIG. 3 illustrates a top view of the driving mechanism with linear clamp as shown in FIG. 2.
Figure 4:
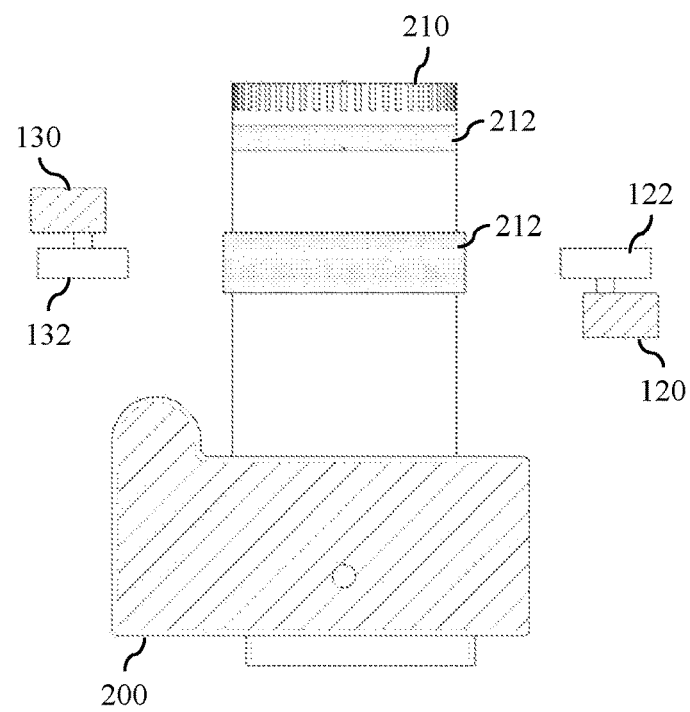
FIG. 4 illustrates a cross-sectional view taken along the line A-A as shown in FIG. 2.

FIG. 2 illustrates a structural schematic view of a driving mechanism with linear clamp according to an embodiment of the present invention, FIG. 3 illustrates a top view of the driving mechanism with linear clamp as shown in FIG. 2, and FIG. 4 illustrates a cross-sectional view taken along the line A-A as shown in FIG. 2. Referring to FIG. 2 to FIG. 4, the driving mechanism with linear clamp 100 for driving a rotatable ring 212 of a lens 210 on a camera 200 to rotate is composed of a base 110, a driving unit 120, a slave unit 130 and a clamping unit 140. In the present embodiment, the lens 210 as shown in FIG. 4 can be a zoom lens and have two rotatable rings 212, one focus ring and one zoom ring. In contrast, in another non-illustrated embodiment, the lens can be a prime lens and thus only have a focus ring.

The camera 200 is hold on the base 100, while the driving unit 120 and the slave unit 130 are glidingly disposed on the base 100 and located at opposite sides of the lens 210. The driving unit 210 comprises at least a driven wheel 122, while the slave unit 130 comprises at least an idler wheel 132. The clamping unit 140 is disposed on the base 110 for driving the driving unit 120 and the slave unit 130 to synchronously move toward the lens 210, so as to let the driven wheel 122 and the idler wheel 132 lean against the rotatable ring 212 in different directions with a balanced force. The idler wheel 132 will be rotated by the rotatable ring 212 when the driving unit 120 drives the driven wheel 122 to rotate the rotatable ring 212. Thus, the driving mechanism with linear clamp 100 in the present invention is not only suitable for various lenses 210 with different diameters but also unable to push away the camera 200 and the lens 210.

In detail, in the present embodiment, the base 110 can have a hole 112 and the camera 200 can be fastened on the base 100 by a screw (not shown) passing through the hole 112. In addition, the base 100 can further have a guiding groove 114, and the clamping unit 140 can be composed of two gear racks 142 and 144 disposed in the guiding groove 114, a gear wheel 146 engaged between the gear racks 142 and 144, and a hand screw 148 connecting to the gear wheel 146. The driving unit 120 can be disposed to the gear rack 142 and the slave unit 130 can be disposed to the gear rack 144. Accordingly, when the hand screw 148 is rotated in the clockwise direction, the gear wheel 146 will be rotated in the direction of arrow 149 and bring the driving unit 120 and the slave unit 130 to synchronously move toward the lens 210 via the gear racks 142 and 144, so as to enable the driven wheel 122 and the idler wheel 132 to lean against the rotatable ring 212 in different directions. In contrast, when the hand screw 148 is rotated in the counter-clockwise direction, the gear wheel 146 will bring the driving unit 120 and the slave unit 130 to synchronously move away from the lens 210 via the gear racks 142 and 144, so as to enable the driven wheel 122 and the idler wheel 132 to release the rotatable ring 212.

Moreover, in other non-illustrated embodiments, each of the driving unit and the slave unit can be glidingly disposed to the base via at least one of a linear guide rod mechanism, a lead screw mechanism, a linear rail mechanism and a set of gear rack and gear wheel. In the present embodiment, the driven wheel 122 bringing the rotatable ring 212 to rotate is directly driven by the motor (not shown) of the driving unit 120. However, in other non-illustrated embodiments, the driving unit can also be composed of a plurality of driven wheels and a motor connecting to one of the driven wheels. In such a case, the driven wheel bringing the rotatable ring to rotate is indirectly driven by the motor (not shown). Herein, the driven wheel can be a pulley, a gear wheel or a combination thereof. For example, the motor can directly drive a pulley to rotate, and then the pulley can bring another pulley leaning against the rotatable ring to rotate via friction or a timing belt. Also, the motor can directly drive a gear wheel to rotate, and then the gear wheel can engage with a gear ring fitting around the rotatable ring or another gear wheel leaning against the rotatable ring, or be connected with another gear wheel leaning against the rotatable ring via a timing belt.

Figure 5:
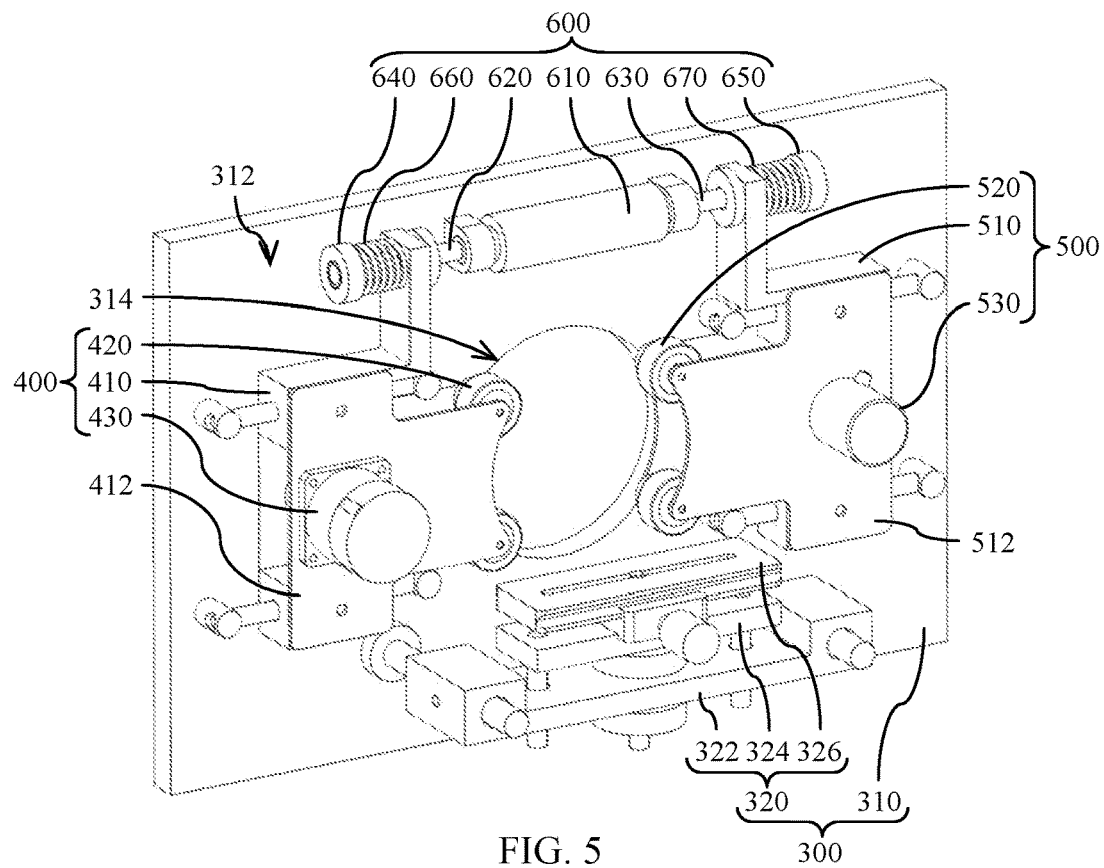
FIG. 5 illustrates a structural schematic view of a driving mechanism with linear clamp according to another embodiment of the present invention.

FIG. 5 illustrates a structural schematic view of a driving mechanism with linear clamp according to another embodiment of the present invention. Referring to FIG. 5, in the present embodiment, the base 300 is composed of a holding piece 310 and a sliding piece 320, wherein one of the holding piece 310 and the sliding piece 320 has at least a guiding portion, while the other one has at least a sliding portion, so as to enable the sliding piece 320 to be slid related to the holding piece 310. For example, the holding piece 310 can be a cover plate and have an installation surface 312 and a round hole 314 passing through the installation surface 312. The sliding piece 320 can be composed of two sliding blocks 322, 324 and a quick release plate 326. In the present embodiment, the sliding block 322 is glidingly disposed to the installation surface 312, for example under the round hole 314, via a linear guide rod mechanism composed of two pairs of guiding rod and related guiding hole. Further, the sliding block 324 is glidingly disposed to the sliding block 322 via a similar linear guide rod mechanism, for example also composed of two pairs of guiding rod and related guiding hole. In contrast, the quick release plate 326 for holding a camera is glidingly disposed to the sliding block 324 via a linear rail mechanism composed of two opposite ribs and related guiding grooves. Hence, the camera can be moved forth and back along an axial direction of the lens, moved up and down along a radial direction of the lens, and moved left and right along a lateral direction of the lens, so as to align the lens with the round hole 314. Furthermore, in other non-illustrated embodiments, the guiding portion and the sliding portion can be composed of at least one of a linear guide rod mechanism, a lead screw mechanism, a linear rail mechanism and a set of gear rack and gear wheel.

Also, the driving unit 400 is disposed to the installation surface 312 and composed of a connecting piece 410, three driven wheels 420 disposed between two connecting plates 412 of the connecting piece 410, a timing belt (not shown) and a motor 430 disposed to a side of the connecting piece 410 away from the installation surface 312, for example on the connecting plate 412 away from the installation surface 312. The connecting piece 410 is glidingly disposed to the left side of the round hole 314 via a linear guide rod mechanism composed of two pairs of guiding rod and related guiding hole. Two of the driven wheels 420 are timing wheels disposed to the connecting piece 410 facing toward the round hole 314, and each of them is composed of a gear wheel and a pulley coaxial to each other, while the other driven wheel 420 (located between the two connecting plates 412 and thus not shown) is a gear wheel connecting to a spindle of the motor 430, and the timing belt connects all of the gear wheels of the driven wheels 420, so that the motor 430 can synchronously drive the driven wheels 420 to rotate via the timing belt. Moreover, each of the pulleys of the driven wheels 420 can have textures to increase the friction for bringing the rotatable ring to rotate.

Similarly, the slave unit 500 is disposed on the installation surface 312 as well and composed of a connecting piece 510, three idler wheels 520 disposed between two connecting plates 512 of the connecting piece 510, a timing belt (not shown) and an encoder 530 disposed to a side of the connecting piece 510 opposite to the installation surface 312, for example on the connecting plate 512 away from the installation surface 312. The connecting piece 510 is glidingly disposed to the right side of the round hole 314 via a linear guide rod mechanism composed of two pairs of guiding rod and related guiding hole. Two of the idler wheels 520 are timing wheels disposed to the connecting piece 510 facing toward the round hole 314, and each of them is composed of a gear wheel and a pulley coaxial to each other, while the other idler wheel 520 (located between the two connecting plates 512 and thus not shown) is a gear wheel connecting to a spindle of the encoder 530, and the timing belt connects all of the gear wheels of the idler wheels 520. Therefore, all of the idler wheels 520 can be synchronously rotated by the timing belt. Also, each of the pulleys of the idler wheels 520 can have textures to increase the friction for being brought to rotate by the rotatable ring.

Furthermore, the clamping unit 600 is also disposed on the installation surface 312 and composed of a handle 610, two lead screws 620, 630 and two nuts 640, 650. In the present embodiment, the handle 610 is disposed to the upper side of the round hole 314. Further, the lead screw 620 and the nut 640 are screwed on the left end of the handle 610 and have right hand spirals, and the driving unit 400 is connected to the nut 640. In contrast, the lead screw 630 and the nut 650 are screwed on the right end of the handle 610 and have left hand spirals, and the slave unit 500 is connected to the nut 650. Accordingly, the nut 640 will be moved toward the handle 610 along the lead screw 620 while the nut 650 will be moved toward the handle 610 along the lead screw 630 when the handle 610 is rotated upward. In another word, the nuts 640 and 650 will bring the driving unit 400 and the slave unit 500 synchronously to move toward the lens (not shown in FIG. 5), so as to enable the driven wheel 420 and the idler wheel 520 to lean against the rotatable ring in different directions.

As a result, when the motor 430 drives the rotatable ring to rotate via the pulleys of the driven wheels 420, the camera and its lens won't be pushed away since the pulleys of the two idler wheels 520 facing toward the round hole 314 stably lean against the rotatable ring in an opposite direction. In addition, the two idler wheels 520 are rotated along with the rotatable ring and bring the other idler wheel 520 connecting to the encoder 530 to synchronously rotate by the connection of the timing belt and the gear wheels of the idler wheels 520, so as to enable the encoder 530 to count a rotation number of the rotatable ring. In contrast, the nut 640 will be moved away from the handle 610 along the lead screw 620 while the nut 650 will be moved away from the handle 610 along the lead screw 630 when the handle 610 is rotated downward, so as to enable the driving unit 400 and the slave unit 500 to be moved away from the lens (not shown in FIG. 5) synchronously.

In other non-illustrated embodiments, the clamping unit can be composed of a handle, a lead screw and two nuts. The left part of the lead screw and one of the nuts have right hand spirals, while the right part of the lead screw and the other one of the nuts have left hand spirals, and the handle is disposed to the left side of the right hand spirals, the right side of the left hand spirals or between the right hand spirals and the left hand spirals. In another word, other than disposing the handle 610 between the driving unit 400 and the slave unit 500 as shown in FIG. 5, the handle 610 can also be disposed to the left side of the nut 640 or the right side of the nut 650 in other non-illustrated embodiments. Moreover, the clamping unit 600 can be composed of not only a linear guide rod mechanism as shown in the present embodiment, but also at least one of a linear guide rod mechanism, a lead screw mechanism, a linear rail mechanism and a set of gear rack and gear wheel in other non-illustrated embodiments. Besides, the clamping unit 600 can be not only moved manually as shown in the present embodiment, but also driven by a motor in other non-illustrated embodiments.

In addition, the clamping unit 600 in the present embodiment can further include elastic pieces 660 and 670. The driving unit 400 is glidingly disposed between two stoppers of the nut 640, and the elastic piece 660 is fitting onto the nut 640 and located between the left stopper of the nut 640 and the driving unit 400. In contrast, the slave unit 500 is glidingly disposed between two stoppers of the nut 650, and the elastic piece 670 is fitting onto the nut 650 and located between the right stopper of the nut 650 and the slave unit 500. Therefore, if we keep rotating the handle 610 upward to bring the nuts 640, 650 synchronously moving toward the handle 610 after the driven wheel 420 and the idler wheel 520 lean against the rotatable ring, the elastic pieces 660, 670 will be compressed to prevent the lens from being damaged due to overloading.

Figure 6:
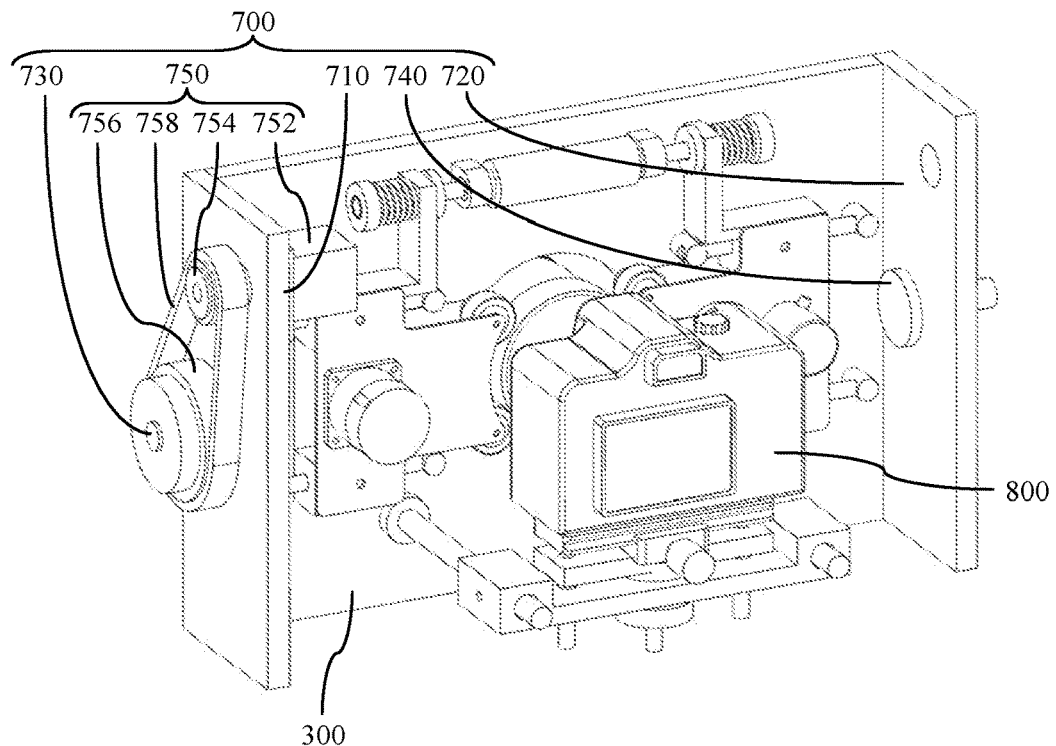
FIG. 6 illustrates a structural schematic view of a driving mechanism with linear clamp according to yet another embodiment of the present invention.

FIG. 6 illustrates a structural schematic view of a driving mechanism with linear clamp according to yet another embodiment of the present invention. The driving mechanism with linear clamp in the present embodiment is similar to the previous one, but further comprises a tilt unit 700 disposed on the base 300. Referring to FIG. 6, the tilt unit 700 can be composed of two side plates 710, 720, two shafts 730, 740 and a driving unit 750. The side plates 710 and 720 are disposed to two opposite sides of the base 300, the shafts 730 and 740 are coaxial to each other and perpendicular to the center line of the round hole 314, wherein the shaft 730 is disposed to the side plate 710 and the shaft 740 is disposed to the side plate 720.

Moreover, the driving unit 750 can be composed of a motor 752, two gear wheels 754, 756 and a timing belt 758, wherein the motor 752 is disposed to the inner side of the side plate 710, the gear wheel 754 is fixed on a spindle of the motor 752, the gear wheel 756 is fixed on an outer case (not shown) and rotatably fitting on the shaft 730, and the timing belt 758 connects the gear wheels 754, 756. Thus, when the motor 752 is activated, all of the base 300, the side plates 710, 720, the shafts 730, 740, the motor 752, the gear wheel 754 and the camera 800 are rotated about the gear wheel 756 via the connection of the gear wheels 754, 756 and the timing belt 758, so as to adjust the tilting angle of the camera 800. It should be noted that, other than using a motor, two gear wheels and a timing belt in the present embodiment, the driving unit can also be implemented by two gear wheels engaged to each other and a motor connected to one of the gear wheels, i.e., without using the timing belt.

In summary, in the present invention, the clamping unit can bring the driving unit and the slave unit to synchronously move toward the lens to let the driven wheel and the idler wheel lean against the rotatable ring in different directions. Therefore, the clamping unit can bring the driving unit can be adapted to various sizes of cameras and lenses. In addition, when the driving unit drives the driven wheel to rotate the rotatable ring, the idler wheel will stably lean against the rotatable ring from an opposite direction, so as to prevent from the camera and the lens being pushed away. Further, the driving mechanism with linear clamp can also comprise two elastic pieces, wherein one of them is disposed between the driving unit and the clamping unit, and the other one is disposed between the slave unit and the clamping unit. Therefore, if the users keep rotating the handle after the driven wheel and the idler wheel lean against the rotatable ring, those elastic pieces will be compressed to prevent the lens from being damaged due to overloading.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A driving mechanism with linear clamp for driving a rotatable ring of a lens on a camera to rotate, comprising:
   a base, wherein the camera is hold on the base;
   a driving unit, glidingly disposed on the base and comprising at least a driven wheel;
   a slave unit, glidingly disposed on the base and comprising at least a idler wheel, wherein the driving unit and the slave unit are located at opposite sides of the lens; and
   a clamping unit, disposed on the base for driving the driving unit and the slave unit to synchronously move toward the lens to let the driven wheel and the idler wheel lean against the rotatable ring in different directions, wherein the idler wheel will be rotated by the rotatable ring when the driving unit drives the driven wheel to rotate the rotatable ring.

2. The driving mechanism with linear clamp as claimed in claim 1, wherein the base comprises:
   a holding piece, wherein the driving unit and the slave unit are glidingly disposed to the holding piece, and the clamping unit is disposed to the holding piece; and
   a sliding piece, glidingly disposed to the holding piece and holding the camera, wherein at least one of the holding piece and the sliding piece has at least a guiding portion, the other one of the holding piece and the sliding piece has at least a sliding portion, and the guiding portion matches with the sliding portion to enable the camera to be slid related to the holding piece at least along an axial direction of the lens, a radial direction of the lens and a lateral direction perpendicular to the axial direction and the radial direction.

3. The driving mechanism with linear clamp as claimed in claim 2, wherein the holding piece is a cover plate and has an installation surface and a round hole passing through the installation surface, the lens aligns with the round hole, and the sliding piece, the driving unit, the slave unit and the clamping unit are disposed on the installation surface around the round hole.

4. The driving mechanism with linear clamp as claimed in claim 2, wherein the guiding portion and the sliding portion are composed of at least one of a linear guide rod mechanism, a lead screw mechanism, a linear rail mechanism and a set of gear rack and gear wheel.

5. The driving mechanism with linear clamp as claimed in claim 1, wherein each of the driving unit and the slave unit is glidingly disposed to the base via at least one of a linear guide rod mechanism, a lead screw mechanism, a linear rail mechanism and a set of gear rack and gear wheel.

6. The driving mechanism with linear clamp as claimed in claim 1, wherein the driving unit comprises:
   a connecting piece, glidingly disposed to the base, and the driven wheel disposed to a side of the connecting piece facing toward the lens, wherein the clamping unit is capable of bringing the connecting piece and the slave unit to synchronously move toward the lens; and
   a motor, connecting with the driven wheel, so as to rotate the rotatable ring via the driven wheel.

7. The driving mechanism with linear clamp as claimed in claim 1, wherein a number of the driven wheel is plural, and the driving unit further comprises:
   a connecting piece, glidingly disposed to the base, and at least one of the driven wheels is disposed to a side of the connecting piece facing toward the lens, wherein the clamping unit is capable of bringing the connecting piece and the slave unit to synchronously move toward the lens;
   a timing belt, connecting the driven wheels; and
   a motor, connecting with one of the driven wheels and capable of rotate the rotatable ring via the timing belt and the driven wheels.

8. The driving mechanism with linear clamp as claimed in claim 1, wherein the slave unit further comprises a connecting piece glidingly disposed to the base, the idler wheel is disposed to a side of the connecting piece facing toward the lens, and the clamping unit is capable of bringing the driving unit and the connecting piece to synchronously move toward the lens.

9. The driving mechanism with linear clamp as claimed in claim 1, wherein a number of the idler wheel is plural, and the slave unit further comprises:
   a connecting piece, glidingly disposed to the base, and at least one of the idler wheels is disposed to a side of the connecting piece facing toward the lens, wherein the clamping unit is capable of bringing the driving unit and the connecting piece to synchronously move toward the lens; and
   a timing belt, connecting the idler wheels.

10. The driving mechanism with linear clamp as claimed in claim 1, wherein the slave unit further comprises an encoder connecting with the idler wheel for counting a rotation number of the rotatable ring.

11. The driving mechanism with linear clamp as claimed in claim 1, wherein each of the driven wheel and the idler wheel is a pulley, a gear wheel or a combination thereof.

12. The driving mechanism with linear clamp as claimed in claim 1, wherein each of the driven wheel and the idler wheel is a pulley having textures on a surface facing toward the rotatable ring.

13. The driving mechanism with linear clamp as claimed in claim 1, wherein the clamping unit is composed of at least one of a linear guide rod mechanism, a lead screw mechanism, a linear rail mechanism and a set of gear rack and gear wheel.

14. The driving mechanism with linear clamp as claimed in claim 1, wherein the clamping unit is driven by a motor and capable of bringing the driving unit and the slave unit to synchronously move toward the lens.

15. The driving mechanism with linear clamp as claimed in claim 1, wherein the clamping unit comprises:
   a lead screw, having a first spiral and a second spiral with opposite spiral directions;
   a first nut, screwed on the first spiral and the driving unit connecting with the first nut; and
   a second nut, screwed on the second spiral and the slave unit connecting with the second nut, wherein the first nut and the second nut bring the driving unit and the slave unit to synchronously move toward the lens when the lead screw rotates.

16. The driving mechanism with linear clamp as claimed in claim 15, wherein the lead screw further comprises a handle disposed between the first spiral and the second spiral.

17. The driving mechanism with linear clamp as claimed in claim 15, wherein the lead screw further comprises a handle, and one of the first spiral and the second spiral is disposed between the handle and the other one of the first spiral and the second spiral.

18. The driving mechanism with linear clamp as claimed in claim 1, further comprising at least a first elastic piece and at least a second elastic piece, wherein the first elastic piece is disposed between the driving unit and the clamping unit, and the second elastic piece is disposed between the slave unit and the clamping unit.

19. The driving mechanism with linear clamp as claimed in claim 1, further comprising a tilt unit disposed to the base, wherein the tilt unit comprises:
   at least a side wall, connecting with an edge of the base;
   at least a shaft, connecting with the side wall; and
   at least another driving unit, capable of tilting the camera by driving the side wall and the base to rotate about the shaft.

20. The driving mechanism with linear clamp as claimed in claim 19, wherein the another driving unit drives the side wall and the base to rotate about the shaft by at least a gear wheel, at least a timing wheel, at least a timing belt or a combination thereof driven by a motor.

* * * * *